Sept. 12, 1933.  E. A. JOHNSTON  1,926,337
COTTON PICKING MECHANISM
Filed Aug. 19, 1931  2 Sheets-Sheet 1
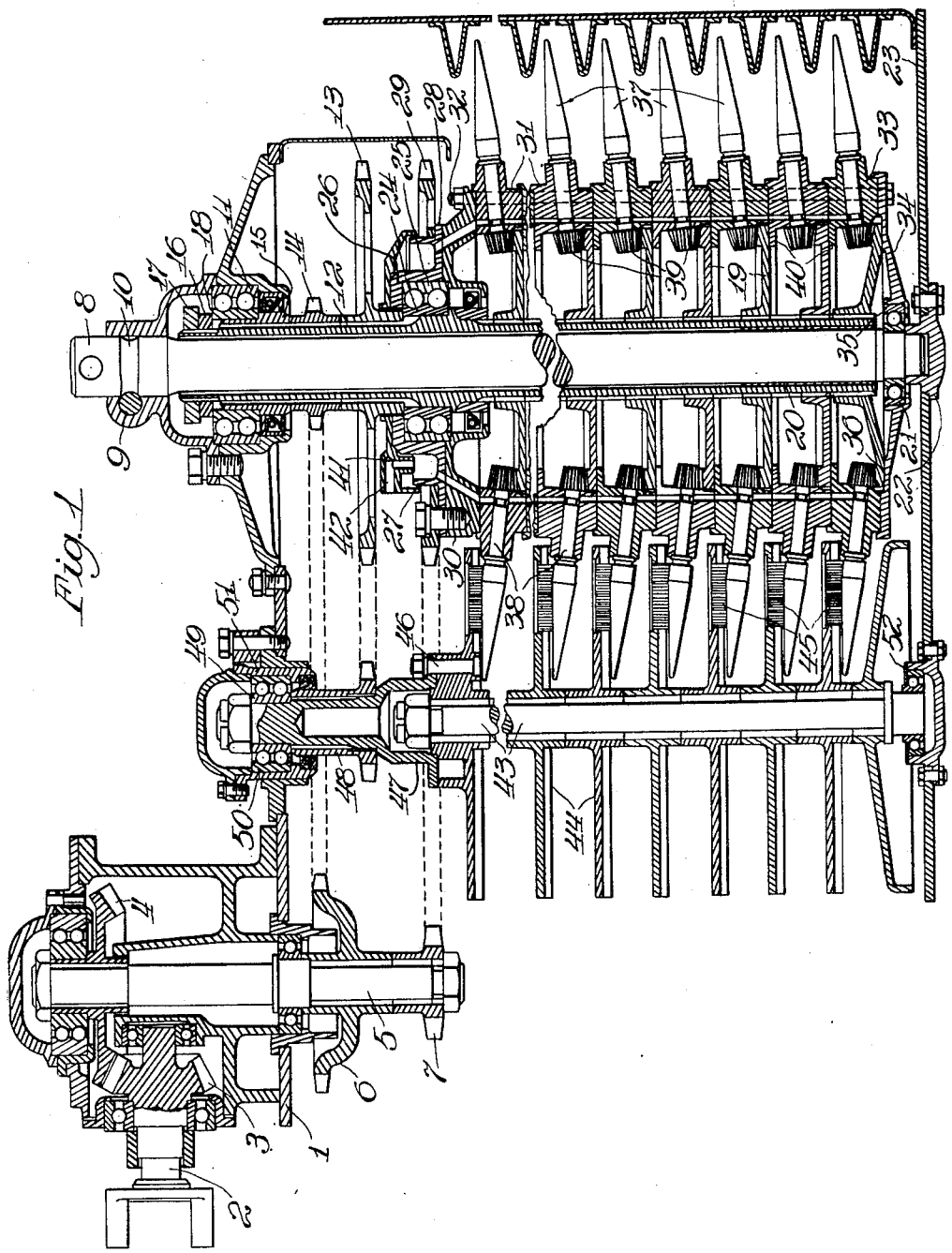
Inventor
Edward A. Johnston Sept. 12, 1933.  E. A. JOHNSTON  1,926,337
COTTON PICKING MECHANISM
Filed Aug. 19, 1931   2 Sheets-Sheet 2
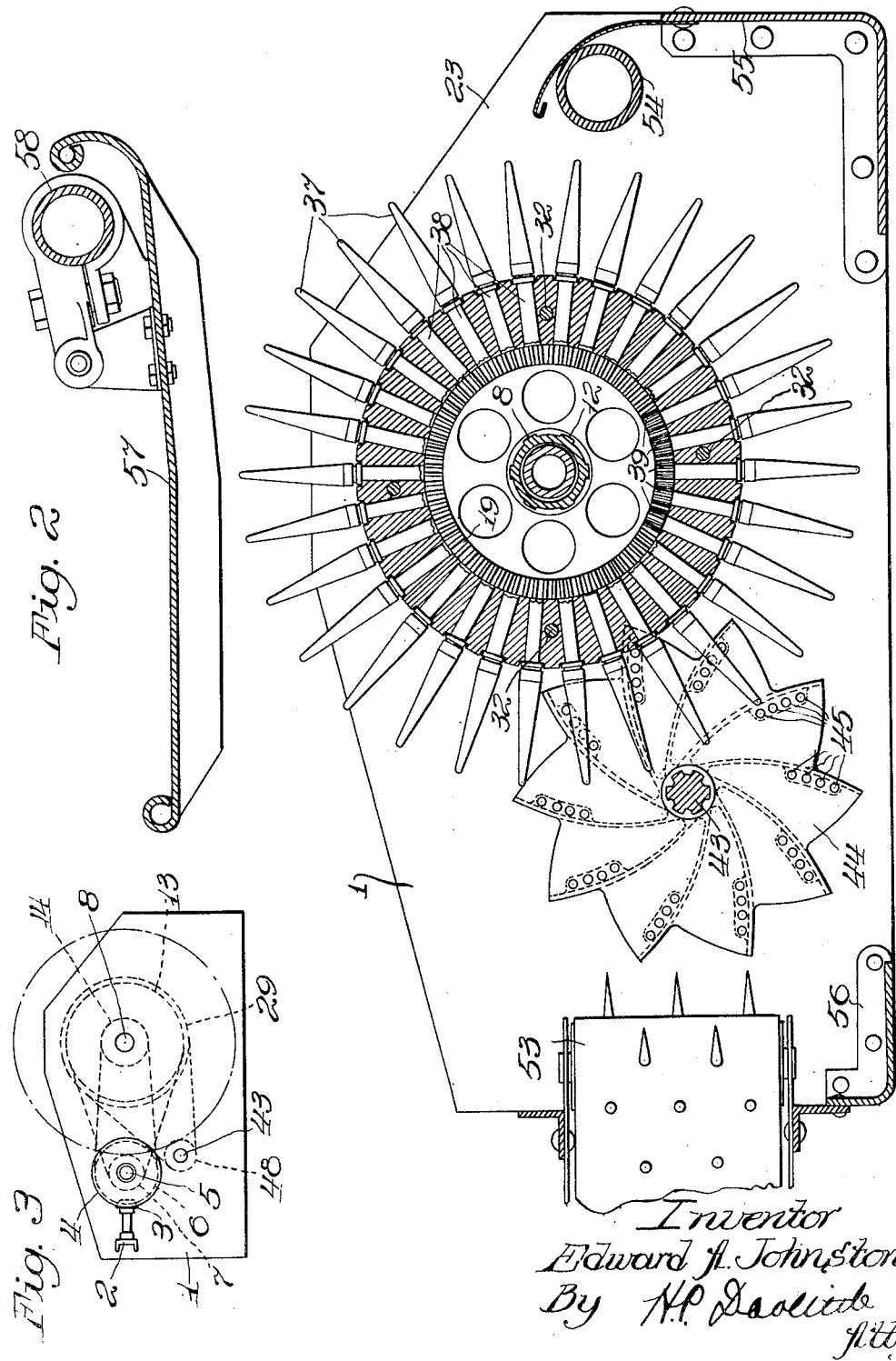
Inventor
Edward A. Johnston
By H.P. Doolittle
Atty.

Patented Sept. 12, 1933

1,926,337

UNITED STATES PATENT OFFICE 1,926,337

COTTON PICKING MECHANISM

Edward A. Johnston, Chicago, Ill., assignor to International Harvester Company, a corporation of New Jersey Application August 19, 1931. Serial No. 557,998

15 Claims. (Cl. 56—44)

This invention relates to a cotton picker.

More specifically, it relates to a drum construction and spindle drive for a picker employing a drum on which picker fingers are rotatably mounted.

The principal object of the invention is to devise a simplified drum structure and spindle drive. Another object is to construct a drum structure which can be suspended from an overhead support whereby the weight of the parts may be supported from a rigid overhead structure. Another object is to provide a drum structure, made up of substantially identical elements, whereby the manufacture will be simplified. Other more specific objects will be apparent from the description to follow.

The objects of the invention are accomplished by the construction and operation of a device as illustrated in the drawings, in which:

Figure 1 is a sectional view, showing an embodiment of the present invention;

Figure 2 is a plan view, partly in section, showing the essential features of the invention and other related parts which function therewith in the operation of the machine; and Figure 3 shows the relative position of the driving shafts and indicates the driving chains which connect them.

The embodiment shown is particularly adaptable to be mounted on and operated by a self propelled traction machine such as an agricultural tractor of a well known type. Application Serial No. 311,734, filed October 11, 1928, shows such a picker mounted on a tractor. The present invention is an improved construction of such a type of picker.

As shown in Figure 1, the main housing 1 consists of several parts, all rigid with respect to one another. Said housing is secured in desired relationship to a supporting means not shown. Power is transmitted to the shaft 2, which carries a bevel gear 3 operatively engaging a bevel gear 4 mounted upon a vertical shaft 5. Said shafts are supported in ball bearings, as illustrated. The shaft 5 carries two chain sprockets 6 and 7 for driving the picker mechanism, as will be hereinafter described. A supporting shaft 8 is rigidly secured to the housing 1 by means of a bolt 9 which extends through a portion of the housing and lies within a groove 10 formed on said shaft. The shaft 8 depends vertically downwardly. The housing 1 is provided with a ball bearing race 11 arranged concentrically with respect to the shaft 8. A sleeve 12, rotatably fitted over the shaft 8, is provided with a splined upper portion on which a large diameter chain sprocket 13 and a smaller diameter chain sprocket 14 are non-rotatably mounted. The sprocket 14 is in alignment with the sprocket 6. A spacer member 15 is fitted above said sprockets and securing members 16 and 17 hold the entire assembly in position. The member 15 is provided with a shoulder against which a ball race 18 abuts. Said ball race also abuts the lower side of the member 16, being thereby held securely in position. Ball bearings are fitted between the races 11 and 18, said races being of a construction which will take axial as well as radial loads. This construction provides for the suspension of all the elements carried below said bearing. The lower portion of the sleeve 12 is splined and carries non-rotatably mounted thereon, a plurality of evenly spaced ring gears 19. Said gears are provided with teeth on their upper axial faces, said teeth being inclined at a slight angle downwardly. The lower portion of said gears, that is, the faces opposite the gear teeth, are finished to provide a thrust bearing surface.

A bushing 20 is fitted between the shaft 8 and the sleeve 12 at the lower end thereof. The sleeve does not contact with the shaft in any other location. The lower end of the shaft 8 is provided with a ball race 21 for a purpose to be hereinafter described. Beyond said race the extreme end of the shaft fits in an aligning member 22 which is secured to a bottom plate 23. Said bottom plate is suspended from the upper housing by means not shown in the drawings. Said plate serves only to maintain the lower ends of the rotating elements in alignment and does not carry the weight of said elements. At an intermediate point on the sleeve 12 below the sprocket 13, a shoulder is formed against which a ball race 24 is seated. A cooperatively arranged ball race 25 is fitted in a housing member 26. The bearing formed by said races and the bearings positioned therebetween is of a type to take axial as well as radial load, whereby the housing member 26 and the elements carried thereby may be sustained from the bearing.

Around the outside of the member 26 an annular oil trough is formed by an upstanding flange 27. Beyond the flange 27 a radial flange 28 provides the mounting for a chain sprocket 29. Said sprocket is in horizontal alignment with the chain sprocket 7. An upper drum structure section 30 is rigidly secured below the housing member 26. Below the section 30 a plurality of similar annular sections 31, secured together by axial extending tie-rods 32, form the body of the drum structure. The lowermost section 33 is slightly different in construction, being provided with a face for attaching a bottom member 34, which encloses the lower end of the drum structure. Said member carries a ball race 35 in alignment with the ball race 21, previously referred to.

The bearing formed by said races and the balls therebetween, are designed primarily to carry radial loads. Interiorly of the drum structure the member 34 is provided with a finished bearing face 36 which forms a thrust bearing for the lowermost gear 19. Each of the sections 31 and the section 33 is provided circumferentially with a row of equally spaced axially extending picker spindles 37. Said spindles, as illustrated, are not positioned on outer radii but slant upwardly at a slight angle. Each of the spindles has a bearing portion 38 which extends through a bore formed in the section which carries it. Interiorly of the drum structure a gear 39 is secured to each of the picker spindles. The particular details of construction of the picker spindle are not shown as any conventional construction may be used. The gears 39 are properly beveled to mate with the gears 19. It will be understood that by arranging the spindles at an angle a better gear surface may be formed between the gears 39 and the gears 19, in addition to other advantages obtained by the use of such mounting, as set forth in my Patent No. 1,888,506, dated November 22, 1932.

Each of the sections 31, with the exception of the uppermost one and the section 33, are provided at their upper sides with interiorly extending horizontal flanges 40. Said flanges are finished on their upper sides to form thrust bearing surfaces for the lower faces of the gear 19, as previously described.

Passages are formed in the member 26 communicating with the oil trough therein, in the member 30 and in the sections 31 and 33, to provide for the flow of oil from said trough to the bearing portions of the spindles. Each of the spindles is provided with an annular groove, in alignment with the oil passages, to allow oil to pass downwardly to the succeeding rows of spindles. A cap member 41, fitted over the top of the oil trough, is provided with an oil inlet 42 for supplying lubrication to the oil trough.

Spaced from the shaft 8 means are provided for suspending a doffer shaft 43. Said shaft carries a plurality of spaced elements 44, which carry doffing brushes 45 arranged there around at spaced locations. The doffing brushes 45 are positioned to engage tangentially the uppermost surfaces of the spindles 37. The uppermost of said elements is secured by bolts 46 to a supporting member 47. A chain sprocket 48 is splined on said member and a ball race 49 is rigidly secured thereon. The ball race 49 is in alignment with the ball race 50 mounted in a support 51, which is rigidly secured to the housing 1. The races 49 and 50 and the balls positioned there between are designed to form a bearing for taking axial as well as radial loads, whereby the doffing mechanism may be suspended therefrom.

At the lower end of the doffing shaft 43 a bearing assembly 52 mounted on the bottom plate 23, maintains the shaft in vertical alignment.

In order to better illustrate an embodiment of the invention Figure 2 shows a cotton gathering belt 53, which is designed to remove cotton gathered by the doffing brushes from the spindles. A supporting pipe 54 is also shown, said pipe forming one of the elements for maintaining the bottom plate 23 in position. Angle bars 55 and 56 form portions of the frame structure for enclosing the drum structure and supporting the bottom plate. A deflector 57 for pushing the cotton plant into engagement with the picker spindles, is also shown in Figure 2. Said deflector is supported on a pipe 58. Said pipe is carried by the main housing. The means by which it is attached has not been shown, as the pipe and the shield form no part of the present invention and were shown merely to illustrate how the plants are guided into contact with the picking drum.

As shown in Figure 3, the doffer is positioned laterally with respect to the main driving shaft 5. The driving chains which connect the sprocket 6 with the sprocket 14 and the sprocket 7 with the sprocket 29, are indicated in Figure 3. Also the sprocket on the member 48 is in horizontal alignment with the sprocket 13 and is driven thereby.

The operation of the embodiment of the invention illustrated and described has been explained in connection with the description. Power transmitted from any suitable source to the shaft 2, is transmitted to the shaft 5 and through the chain sprockets 6 and 7 to the chain sprockets 14 and 29. Rotation of the sprocket 14 rotates the sleeve 12 and the members carried thereby, including the ball race 18, the sprocket 13 and the gears 19. From the sprocket 7 power is transmitted to the sprocket 29 which rotates the drum structure, consisting primarily of the members 26 and 30, the sections 31 and 33, and the spindles carried thereby, and the bottom member 34. The sleeve 12 and the drum structure are rotated in the same direction but at quite different speeds, as will be understood by comparing the relative sizes of the power transmitting sprockets. The sleeve 12 is driven at a much higher speed than the drum structure. By means of the gears 19 all of the spindles 37 are simultaneously rotated. At a comparatively high speed said spindles remove the cotton fibers from the plant and rotate on past the doffer, where the brushes 45 remove the cotton fibers from the spindles. The teeth arrangement on the spindles has not been shown as any conventional construction may be used. The doffer is driven at a comparatively high rate of speed, with respect to the drum structure, as will be understood by comparison of the relative sizes of the sprocket 13 and the sprocket on the member 48. Cotton removed by the doffing brushes is thrown into the path of the conveyor 53, which removes it from the machine.

Only a preferred embodiment of the improved drum structure and drive has been illustrated and described. It is understood that applicant intends to cover as his invention all modifications falling within the scope of the appended claims.

What is claimed is:

1. A cotton picker comprising a drum structure consisting of a plurality of similar annular sections secured together, each of said sections carrying circumferentially rows of rotatably mounted picker spindles, gears mounted on said spindles interiorly of the drum structure, means for rotating said drum structure, a rotatable member coaxially mounted with respect to the drum structure, means for independently rotating said member, and a plurality of spaced gears non-rotatably mounted on said member, each of said gears being in driving relationship with respect to one of the rows of spindle gears.

2. A cotton picker comprising a rotatable member supported solely at its upper end, means for rotating said member, a plurality of spaced gears rigidly mounted thereon, a drum structure surrounding said gears, said structure consisting of a plurality of similar annular sections secured together, each of said sections carrying a row of rotatably mounted picker spindles, gears mounted on said spindles interiorly of the drum structure, the gears of each row being in driving relationship with one of the spaced gears, and means to rotate the drum structure independently of the rotatable member.

3. A device as set forth in claim 2, in which the spaced gears have teeth on one radial face and thrust bearing surfaces on the opposite face, and in which thrust bearing surfaces are formed on the drum sections in cooperative relation with the thrust bearing surfaces on the gears.

4. A device as set forth in claim 2, in which the drum structure is supported solely at its upper end.

5. A cotton picker comprising a drum structure, said structure consisting of a plurality of annular sections secured together, a row of picker spindles rotatably mounted around each section, said spindles having bearing portions extending through the sections and being arranged in rows parallel to the axis of the drum structure, an oil trough at the top of the drum structure, and aligned vertical bores formed in the annular sections, said bores being in communication with the oil trough and with the bearing portions of the spindles which pass through the sections.

6. A cotton picker comprising a drum structure arranged vertically and supported solely at its upper end, means for rotating said structure, a plurality of rows of picker spindles spaced in the direction of the drum structure axis, said spindles being rotatably mounted on said structure with driving gears positioned internally thereof, a rotatable member within the drum structure coaxially mounted with respect thereto, means for rotating said member independently of the drum structure, and a plurality of spaced gears mounted on said member, each of said gears operatively engaging the gears of a row of spindles.

7. A cotton picker comprising a drum structure, means for rotating said structure, a plurality of rows of picker spindles spaced in the direction of the drum structure axis, said spindles being rotatably mounted on said structure with driving gears positioned internally thereof, a rotatable member within the drum structure coaxially mounted with respect thereto, means for rotating said member independently of the drum structure, a plurality of spaced gears mounted on said member, and thrust bearing surfaces formed on one face of each of the spaced gears and a mating bearing surface formed on the drum structure, each of said gears operatively engaging the gears of a row of spindles.

8. A cotton picker comprising a drum structure, means for rotating said structure, a plurality of rows of picker spindles spaced in the direction of the drum structure axis, said spindles being rotatably mounted on said structure at acute angles with respect to planes perpendicular to the axis of the drum structure, driving gears mounted on the spindles internally of the drum structure, a rotatable member within the drum structure coaxially mounted with respect thereto, means for rotating said member independently of the drum structure, and a plurality of spaced bevel gears mounted on said member, each of said gears operatively engaging the gears of a row of spindles.

9. A cotton picker comprising a supporting housing, a drum structure rotatably suspended from said housing and supported solely at its upper end, means on the housing for driving said drum, a plurality of picker spindles rotatably mounted on the drum structure, said spindles being provided with driving gears positioned thereon internally of the drum, a drive shaft mounted within the drum coaxially thereof, a plurality of spaced gears mounted on said shaft positioned to engage the spindle gears, and means for driving said shaft independently of the means for driving the drum structure.

10. A cotton picker comprising a supporting housing, a drum structure rotatably suspended from said housing and supported solely at its upper end, means on the housing for driving said drum, a plurality of picker spindles rotatably mounted on the drum structure, said spindles being provided with driving gears positioned thereon internally of the drum, a drive shaft mounted within the drum coaxially thereof, a plurality of spaced gears mounted on said shaft positioned to engage the spindle gears, thrust bearing surfaces formed on the drum structure for each of said gears, and means for driving said shaft independently of the means for driving the drum structure.

11. A cotton picker comprising a supporting housing, a vertically arranged drum structure rotatably suspended from said housing and supported solely at its upper end, means on the housing for driving said drum, a plurality of picker spindles rotatably mounted on the drum structure and positioned at acute angles with respect to horizontal planes, said spindles being provided with driving gears positioned thereon internally of the drum, a drive shaft mounted within the drum coaxially thereof, a plurality of spaced bevel gears mounted on said shaft positioned to engage the spindle gears, and means for driving said shaft independently of the means for driving the drum structure.

12. A cotton picker comprising a supporting housing, a vertically arranged drum structure rotatably suspended from said housing and supported solely at its upper end, means on the housing for driving said drum, a plurality of picker spindles rotatably mounted on the drum structure and positioned at acute angles with respect to horizontal planes, said spindles being provided with driving gears positioned thereon internally of the drum, a drive shaft mounted within the drum coaxially thereof, a plurality of spaced bevel gears mounted on said shaft positioned to engage the spindle gears, thrust bearing surfaces formed on the drum structure for each of said gears, and means for driving said shaft independently of the means for driving the drum structure.

13. A cotton picker comprising a drum structure arranged vertically and supported solely at its upper end, said structure consisting of a plurality of similar annular sections secured together, each of said sections carrying circumferentially arranged rows of rotatably mounted picker spindles, gears mounted on said spindles interiorly of the sections, means for rotating said drum structure, a rotatable member coaxially mounted with respect to the drum structure, means for independently rotating said member, and a plurality of spaced gears non-rotatably mounted on said member, each of said gears being in driving relationship with respect to one of the rows of spindle gears.

14. A cotton picker comprising a drum structure consisting of a plurality of similar annular sections secured together, each of said sections carrying circumferentially arranged rows of rotatably mounted picker spindles, gears mounted on said spindles interiorly of the drum structure, means for rotating said drum structure, a rotatable member co-axially mounted with respect to the drum structure, means for independently rotating said member, and a plurality of spaced gears non-rotatably mounted on said member, each of said gears being in driving relationship with respect to one of the rows of spindle gears and each of the gears being provided with a thrust bearing surface formed thereon and engaging a mating bearing surface formed on one of the drum sections.

15. A cotton picker comprising a drum structure consisting of a plurality of similar annular sections secured together, each of said sections carrying circumferentially arranged rows of rotatably mounted picker spindles, said spindles being arranged at acute angles with respect to planes perpendicular to the axis of the drum structure, gears mounted on said spindles interiorly of the drum structure, means for rotating said drum structure, a rotatable member co-axially mounted with respect to the drum structure, means for independently rotating said member, and a plurality of spaced gears non-rotatably mounted on said member, each of said gears being in driving relationship with respect to one of the rows of spindle gears and each of the gears being provided with a thrust bearing surface formed thereon and engaging a mating bearing surface formed on one of the drum sections.

EDWARD A. JOHNSTON.